May 12, 1970  F. J. HICKEY  3,511,630
GLASS MELTING AND REFINING FURNACE WITH GLASS LEVEL CONTROL MEANS
Filed May 9, 1967  3 Sheets-Sheet 1

INVENTOR.
FRANK J. HICKEY
BY
William D. Fosdick
AGENT

May 12, 1970    F. J. HICKEY    3,511,630
GLASS MELTING AND REFINING FURNACE WITH GLASS LEVEL CONTROL MEANS
Filed May 9, 1967    3 Sheets-Sheet 2

INVENTOR.
FRANK J. HICKEY
BY
William D. Fosdick
AGENT

May 12, 1970   F. J. HICKEY   3,511,630
GLASS MELTING AND REFINING FURNACE WITH GLASS LEVEL CONTROL MEANS
Filed May 9, 1967   3 Sheets-Sheet 3

INVENTOR.
FRANK J. HICKEY
BY
William D. Fosdick
AGENT

United States Patent Office 3,511,630
Patented May 12, 1970

3,511,630
GLASS MELTING AND REFINING FURNACE WITH GLASS LEVEL CONTROL MEANS
Frank J. Hickey, Corning, N.Y., assignor to Corning Glass Works, Corning, N.Y., a corporation of New York
Filed May 9, 1967, Ser. No. 637,291
Int. Cl. C03b 5/24
U.S. Cl. 65—160　　　　　　　　　　　　　4 Claims

ABSTRACT OF THE DISCLOSURE

A glass melting and refining furnace in which the refining end is circular in horizontal cross-section and is spaced from the melting end. The refining end has a wall structure independent of that of the melting end and is connected to the melting end by a narrow submerged throat. The pressures within the respective ends are independently controllable.

BACKGROUND OF THE INVENTION

Furnaces for the continuous production of glass are generally rectangular in shape and are divided by a bridge wall into a melting end and a refining end. Glass batch is introduced into and melted in the melting end and subsequently the molten glass flows through a submerged throat in the bridge wall to the refining end, where the glass is cooled and distributed for use. In order to minimize the movement of fumes from the melting end to the refining end and the environmental effects of the melting end on the refining end, a shadow wall generally extends upwardly from the bridge wall to the roof of the furnace.

In recent years it has become desirable to manufacture certain glasses which during the melting operation produce fumes which are highly corrosive to the furnace walls. In particular, glasses of the types used in fabricating face plates for color television picture tubes produce extremely corrosive fumes. Inasmuch as the ability of furnace refractories to withstand attack by the fumes is decreased by increasing temperatures, and inasmuch as the bridge wall and the shadow wall are located within the furnace, and, accordingly, are at temperatures higher than the outer walls, corrosion of these parts of the furnace has been a particular problem. Additional disadvantages of conventional furnaces include nonuniform cooling in different locations within the refining ends, the accumulation of stagnant glass in corners of the refining ends, resulting in composition variations in the resultant glass, and nonsymmetrical expansion and contraction, resulting in furnace leaks.

SUMMARY OF THE INVENTION

According to the invention, the above-mentioned disadvantages of conventional glass melting furnaces are avoided by the provision of a furnace in which the melting end and the refining end are separated from one another in a manner such that no common wall exists between them. The refining end is circular in plan view and communicates with the melting end through a narrow submerged throat which is external to both ends of the furnace. Thus, all walls of the furnace are exposed to the cooling effects of the ambient atmosphere, thus causing the walls to be maintained at temperatures lower than those found in conventional furnaces. The corrosive effect of the fumes in the furnace is accordingly reduced, resulting in longer furnace life, and the gas pressures within the respective ends are controlled to avoid variations in glass level. In addition, due to the elimination of corners in which stagnant glass can accumulate, the circular shape of the refining end results in improved uniformity in the composition of the glass produced, while the symmetric expansion and contraction of the walls of the refining end cause a decrease in the leakage of gases from the furnace. Furthermore, due to the fact that the ratio of the wall area of the refining end to its volume is minimized, contact between the glass and the refractory is minimized, resulting in reduced glass contamination by eroded refractory.

DESCRIPTION OF THE PREFERRED EMBODIMENT

Figure 1:
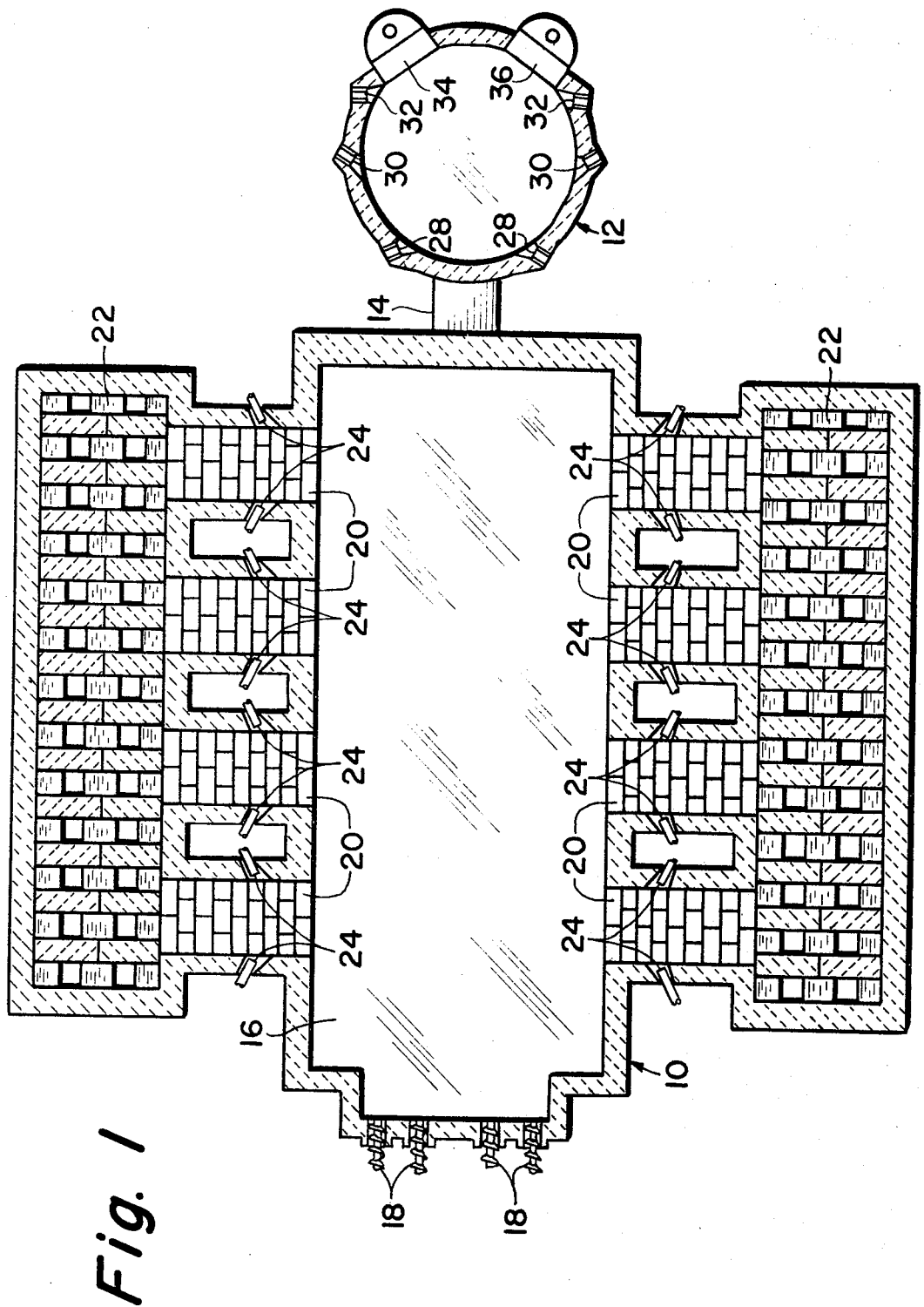
FIG. 1 is a horizontal sectional view taken through a furnace according to the invention.

Referring to the drawing, the furnace of the invention comprises a melting end 10 and a refining end 12. The melting and refining ends are connected by a throat 14, which is below the level of the molten glass 16.

Melting end 10 is of conventional rectangular configuration. Glass batch is fed into the melting end through fill holes by means of convetnional screw conveyors 18. Heat is supplied through conventional regenerative burners 20, air being supplied to the burners through checker chambers 22, while gas is supplied through outlets 24. While heat is being supplied to the glass from the burners on one side of the tank, hot air is being exhausted through the burners and checker chambers on the other side of thet furnace, thereby heating the checker bricks. When the checker bricks have been heated sufficiently by the hot gases, the burners associated therewith are fired, and the burners on the other side of the tank are extinguished, allowing hot gases to be exhausted therethrough and to heat the checker brick associated therewith. In this conventional manner, the operations of the burners are periodically reversed during furnace operation in order to provide regenerative heating.

Refining end 12 is circular in horizontal cross-section, and has a curved dome 26 in the form of a portion of a sphere. Molten glass passing through throat 14 into refining end 12 is maintained at an adequate working temperature by means of paired burners 28, 30 and 32. The burners are oriented such that the nonradial flow pattern is produced, thereby uniformly distributing the heat produced by the burners and avoiding the formation of a hot spot near the center of the refining end. The pair of burners 28, which burners are located closest to the throat, are oriented such that their flames are directed toward an area between the throat and the center of the tank. Similarly, burners 30, located approximately 180° apart and at the sides of the refining end, are oriented such that the flames therefrom are directed to the same general area as those from burners 28. As a result, the burners can be used to add heat to the glass immediately after its emergence from throat 14. In the event that cooling of the glass in that area is desired, cooling air may be directed through burners 28 and 30 to cool the glass at the same locations. Inasmuch as the glass at refining end locations remote from the throat in the absence of additional heating tends to be cooler than glass in the vicinity of the throat, burners 32 are located so as to direct heat across the refining end at its extremity remote from the throat, and in the vicinity of forehearths 34 and 36.

Due to the physical separation of the melting end and the refining ends the gas pressures in the respective ends can be independently controlled, and, if desired, one pressure may be caused to vary in accordance with the other.

Figure 2:
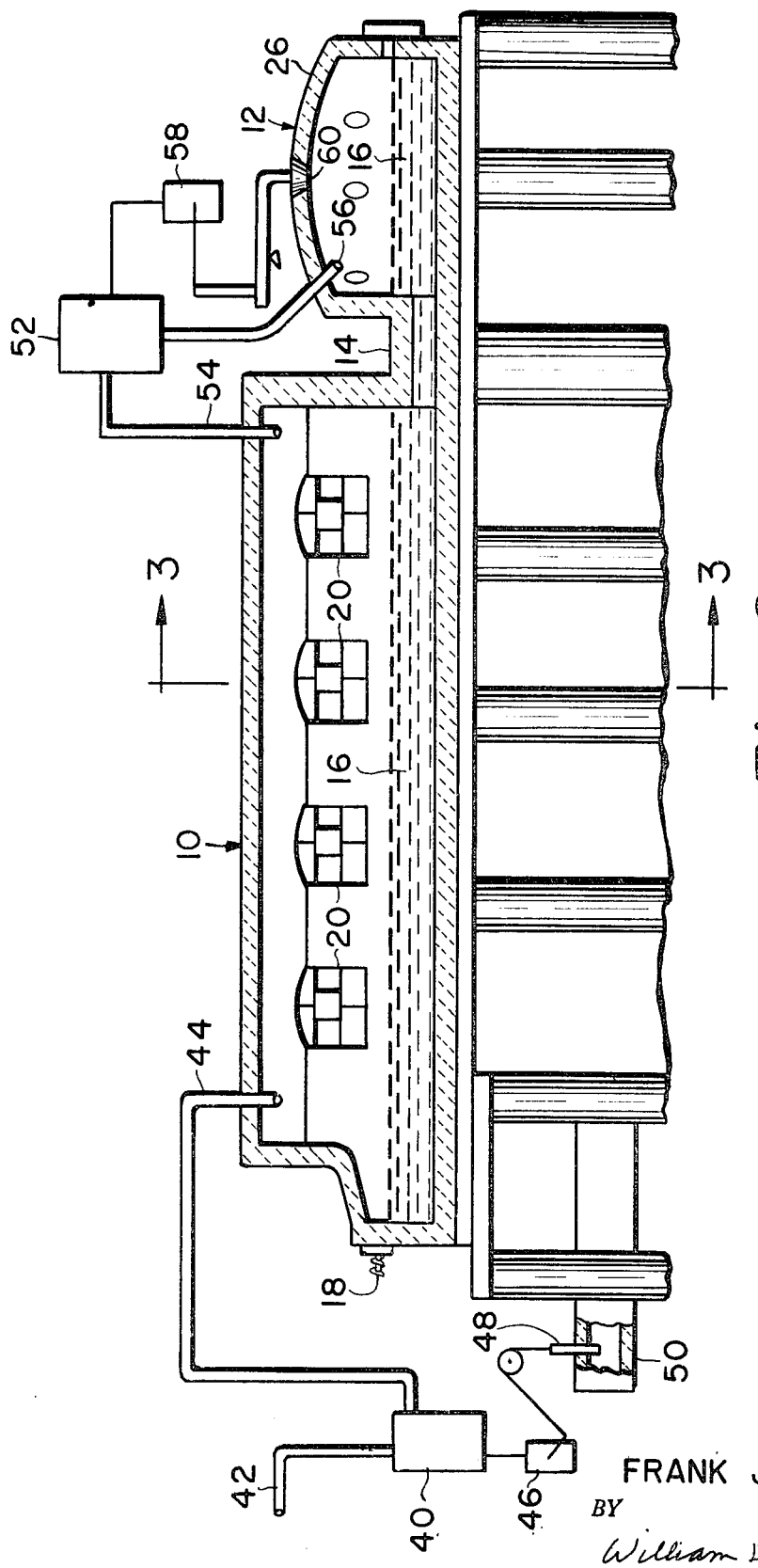
FIG. 2 is a vertical partial sectional view taken through the center of the furnace of FIG. 1.
Figure 3:
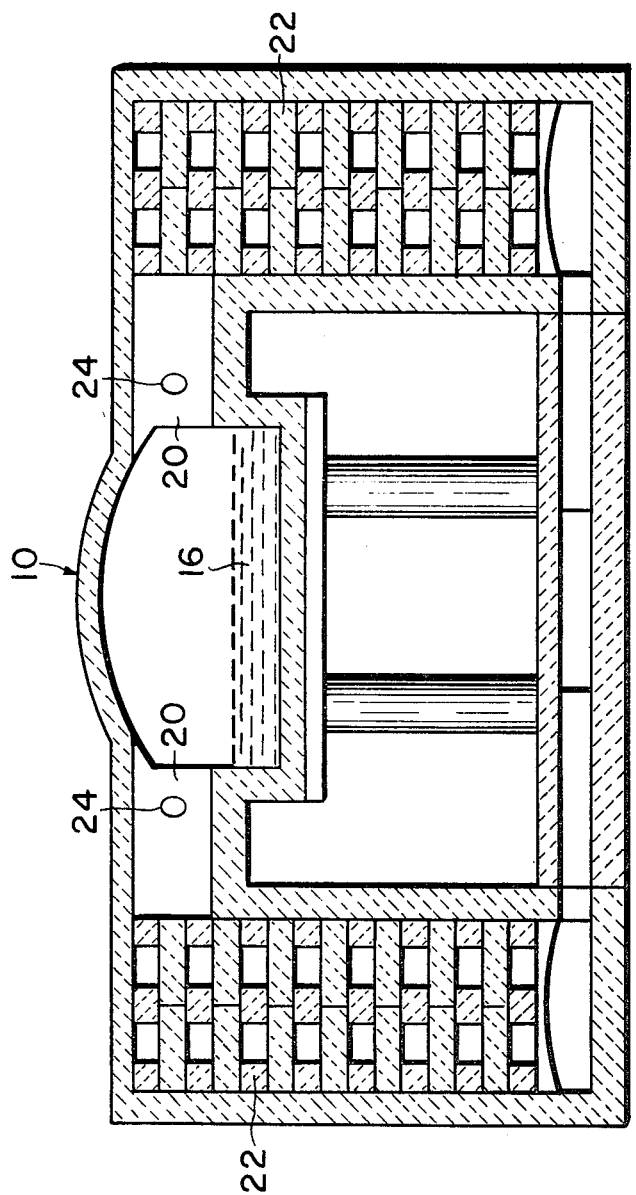
FIG. 3 is a sectional view taken on line 3—3 of FIG. 2.

One such arrangement is illustrated in FIG. 2. A standard differential pressure controller 40 compares the atmospheric pressure at the end of tube 42 with the pressure at the end of tube 42 with the pressure inside the melting end of the furnace at the end of tube 44, the ends of the tubes being preferably at the same elevation. When the relationship between the pressures is other than that for which the controller has been preset, the controller emits a signal to motor 46, which, in turn, either raises or lowers damper 48 in order either to increase or decrease the rate of flow of exhaust gases through flue 50. Inasmuch as gas is continuously supplied to the interior of the melting end through the burners, the resistance to the flow of exhaust gases in the exhaust flue will determine the pressure within the melting end of the furnace. Similarly, pressure controller 52 compares the pressure in the melting end at the end of tube 54 with thet pressure in the refining end at the end of tube 56. When the relationship between the pressures is other than that for which the pressure controller has been preset, the controller emits a signal to motor 58, which, in turn, either raises or lowers exhaust vent 60 in the top of the refining end. In this manner, changes in the pressures within the respective ends relative to one another are minimized, and variations in glass level are avoided.

Inasmuch as the foregoing description has been provided solely as that of a preferred embodiment of the invention, it is intended that the scope of the invention be limited only by the scope of the appended claims.

I claim:

1. A glass melting and refining furnace comprising a melting end, a refining end having a sidewall which is generally circular in horizontal cross-section and which is separate from the walls of said melting end, a throat connecting said refining end with said melting end, means for supplying glass batch to said melting end at a location remote from said throat, means for supplying heat to said melting end to melt batch therein, an exhaust vent in said refining end, motor means for opening and closing said exhaust vent, and pressure controller means for comparing the pressure in said melting end with the pressure in said refining end and for energizing said motor means for opening or closing the exhaust vent in said refining end to thereby minimize changes in pressures within the respective ends and avoid variations in glass level.

2. A glass melting and refining furnace as defined in claim 1 wherein said refining end has a rounded roof in the form of a portion of a sphere, and said exhaust vent is formed in said roof to vent the gases from within said refining end.

3. A glass melting and refining furnace as defined in claim 1 which includes means for directing cooling air to the interior of said refining end in an area near said throat.

4. A glass melting and refining furnace as defined in claim 1 which includes an exhaust flue communicating with said melting end, a damper movable within said flue, second motor means for opening and closing said damper, and differential pressure controller means for comparing atmospheric pressure with the pressure within said melting end and at the preset level for energizing said second motor means to raise or lower the damper within said exhaust flue and thereby maintain a desired pressure within said melting end respective to atmospheric pressure.

References Cited

UNITED STATES PATENTS

| 1,668,700 | 5/1928 | Stickler | 65—347 |
| 1,999,762 | 4/1935 | Howard | 65—347 |
| 3,373,007 | 3/1968 | Ticknor | 65—347 |
| 3,421,876 | 1/1969 | Schmidt | 65—134 |

S. LEON BASHORE, Primary Examiner

E. R. FREEDMAN, Assistant Examiner

U.S. Cl. X.R.

65—27, 135, 159, 168, 347